March 6, 1962   A. S. PATTEN   3,023,470
SCREWLESS CABLE CLIP
Filed Oct. 11, 1957
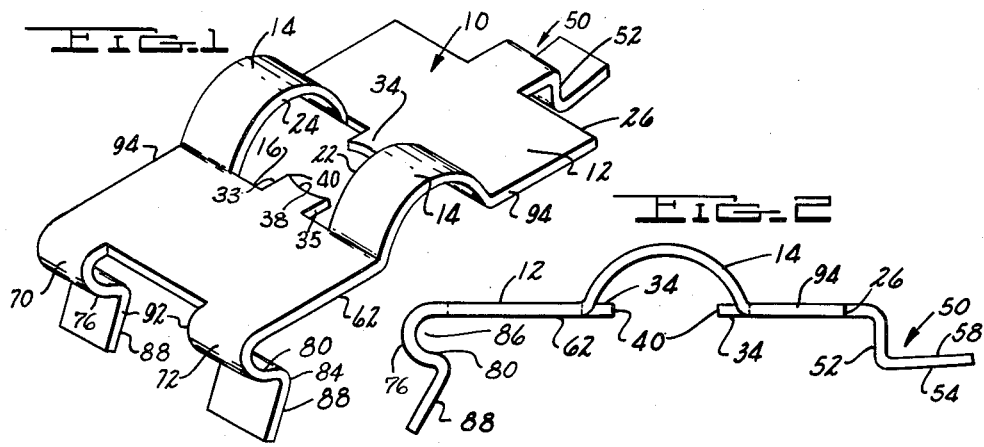
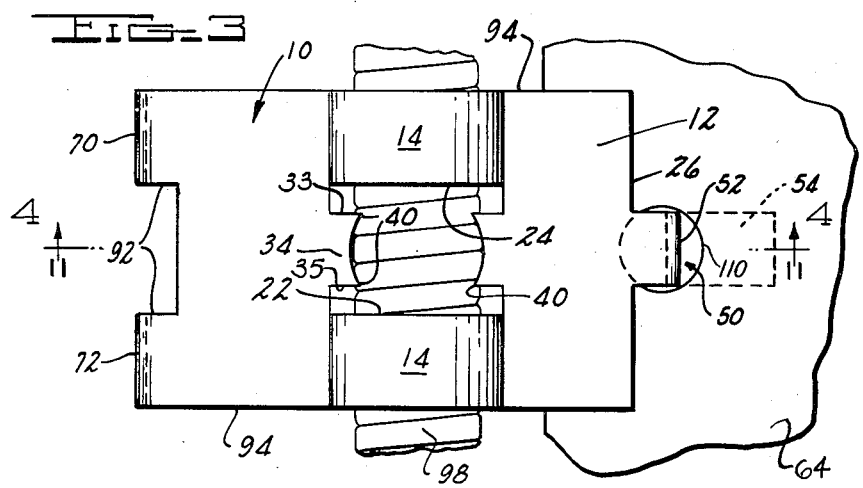
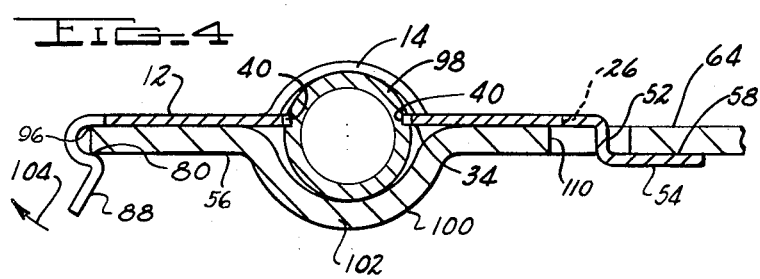
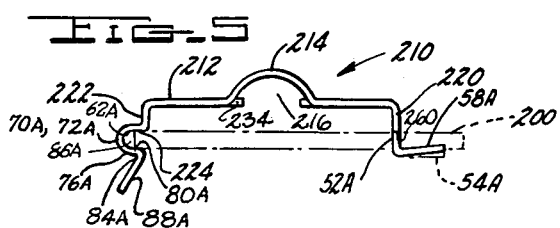
INVENTOR
ALEXANDER S. PATTEN
KOTTS & SHERIDAN
ATTORNEYS

United States Patent Office

3,023,470
Patented Mar. 6, 1962

3,023,470
SCREWLESS CABLE CLIP
Alexander S. Patten, Detroit, Mich., assignor to Multifastener Spring Division Inc., Redford, Mich.
Filed Oct. 11, 1957, Ser. No. 689,509
7 Claims. (Cl. 24—73)

The present invention relates to new and useful improvements in fasteners and more particularly to a one piece resilient fastener which is used to secure a cylindrical part or cable to a commercially produced panel member without the use of screws.

A primary object of the present invention is the provision of a simple, light weight, resilient, one piece fastener which is inexpensive to manufacture, durable in construction, and which can be installed rapidly on commercially available parts with a minimum of time, effort and waste.

Another object of the present invention is the provision of a simple, pivotally mounted, one piece, resilient clip fastener which frictionally engages a panel member and securely holds and positions a cylindrical part.

Still another object of the present invention is the provision of a one piece, resilient clip fastener that can be affixed to a preformed panel member having commercial tolerances which will securely engage the part, and will not be loosened or affected by vibration.

A further object of the present invention is the provision of a simple, one piece, resilient clip fastener which can be applied rapidly in a more facile manner without the use of screws or rivets.

The foregoing objects can be accomplished by the provision of a screwless clip fastener having a substantially flat body portion, with a generally rectangular aperture located therein, the body portion having a centrally located arcuate section for positioning a cylindrical part, a first panel engaging means on one end of the body portion for locating the fastener, a second panel engaging means on the opposite end thereof for retaining the fastener to a panel member, barbed ear members integral with the body portion extending into the rectangular aperture from opposite sides of the aperture, each ear member having two barbs at the extremities of the concave end shape for engagement with the cylindrical part or cable secured.

Other objects of this invention will appear in the following description and appended claims, reference being had to the accompanying drawings forming a part of this specification wherein like reference characters designate corresponding parts in the several views.

In the drawings:

FIG. 1 is a perspective vew of a one piece screwless type clip fastener embodying the present invention.

FIG. 2 is an enlarged side elevational view of the screwless clip fastener illustrated in FIG. 1.

FIG. 3 is a top plan view of the clip fastener illustrated in FIG. 1 and secured to a panel member.

FIG. 4 is a sectional view taken on line 4—4 of FIG. 3.

FIG. 5 is a side elevational view of a modified form of the present invention.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring to the drawings, FIG. 1 illustrates a perspective view of a simple, resilient, screwless type clip fastener which embodies the present invention. The resilient clip fastener 10 is made from sheet metal strip stock and formed to have a substantially flat body portion 12 with a generally rectangular aperture 16 cut therein. The longitudinal area surrounding aperture 16 is formed into two upstanding arcuate sections 14 which are adapted for positioning a cylindrical part thereunder. Both vertical edges 22 and 24 of the generally rectangular aperture 16 are perpendicular and square with the arcuate sections 14. The two remaining edges of the aperture 16 have extending therefrom resilient barbed ear members 34. Both resilient ear members 34 are symmetrical and flat and have a concave center edge portions 38 terminating at barbed points 40 intersecting the longitudinal edges 33 and 35 thereof. Ear members 34 are integral with the flat body portion 12 and the edges 33 and 35 are parallel with the outer longitudinal edges 94 thereof.

On the forward pivotal edge 26 of the flat body portion and centrally located thereon is a tab 50 which is integral with the flat body portion 12. Tab 50 has a downwardly turned portion 52 extending a distance equivalent to the panel thickness and then formed into an outwardly and upwardly turned leg section 54 which engages the underside of a panel member. On the opposite or locking end of the body portion 12 are located two symmetrical panel grip members 70 and 72 with a cutaway space between. Both panel grip members 70 and 72 are integral with the flat body portion 12 and have a first reverse bend 76 which forms a platform area 80 generally parallel with the body 12. A second reverse bend 84 in each of the panel grip members 70 and 72 is made to form a flat inclined ramp portion 88. The space 86 between platform 80 and the underside 62 of the screwless clip fastener body 12 (FIG. 2) is of sufficient depth to receive the edge of a panel member. Both longitudinal inner edges 92 of the panel grip members 70 and 72 and the longitudinal outer edges 94 of the panel body member 12 are parallel and square with each other.

The enlarged side elevational view illustrated in FIG. 2 shows a one piece, resilient, screwless clip fastener member 10 in its free position. The leg portion 54 of tab 50 is formed upwardly and outwardly and the top surface 58 forms an included angle between the downwardly turned portion 52 and the upwardly turned leg portion 54 of somewhat less than 90°. When the clip fastener 10 is installed on a panel member, top surface 58 of the upwardly turned leg portion 54 assumes the position illustrated in FIG. 4 and frictionally engages the underside of the panel member 100. The under surface 62 of the screwless, resilient clip fastener 10 engages the top surface 64 of the panel member 100 and clamps the cylindrical part therebetween.

FIGS. 3 and 4 of the drawings illustrate a top plan and sectional side elevation view of the resilient, screwless clip fastener of the present invention secured to a panel member 100. A Bowden wire cable sheath 98 is positioned under the arcuate portions 14 of the resilient clip fastener 10, while the lower portion of the cable sheath 98 is shown in an arcuate depression 102 located in the panel member. The arcuate depression 102 locates and positions the Bowden wire cable sheath 98 before the resilient clip fastener 10 is secured. Although the point of tangential engagement of the barbed points 40 located on ears 34 is determined by the depth of the arcuate depression 102 in the panel member, the present invention is equally efficient on panel members having arcuate depressions of variable dimensional tolerances. The present construction eliminates the necessity of a special fastener for panel members which have an unusually large or small dimensional depth tolerance (FIG. 4).

To secure clip fastener 10, tab 50 is inserted through opening 110 in the panel member 100 and pivoted about edge 26 until the inclined ramp portions 88 engage the upper edge 96 of the panel member. Upon continued rotation the inclined ramp portions 88 move outward in the direction of arrow 104 until the platform surfaces 80 of the panel grip members 70 and 72 engage the underside 56 of the panel member 100. As the resilient ramp action occurs, platform surfaces 80 engage the underside 56 of panel member 100 while the barbs 40 on ears 34 engage the Bowden wire cable sheath 98. The barbed points 40 are just as effective when they engage the cable sheath proper as when they are positioned either singly or otherwise between the spiral convolutions of the sheath.

When the resilient clip fastener 10 is properly positioned on a cable or cylindrical part 98, the top surface 58 of leg portion 54 is in frictional engagement with the underside 56 of the panel member 100, and the top surface 64 of panel member 100 is in engagement with the underside 62 of the resilient clip member.

FIG. 5 of the drawing illustrates a modified form of the present invention wherein the body portion 212 of the screwless clip fastener member 210 is similar to that of the previous construction. The body portion 212 in the modified form is spaced from the flat panel member 200 (shown in phantom) by perpendicular arms 220 and 222. Arm 220 has a pivotal edge portion 260 which engages the flat panel member 200 and positions the body position 212 from the flat panel member. A downward extension 52A extends through the panel member, while the remaining leg portion 54A is formed upwardly and engages the underside of the panel member.

On the opposite end of the fastener 210 the arm 222 is formed and provides a stop 224 to engage and position the pastener 210 relative to the panel member 200. An extension of the flat panel engaging portion 224 is formed into two panel grip members 70A and 72A with a space between, which construction functions in the same manner as the preferred form previously described. Both panel grip members 70A and 72A are integral with the stop portion 224 and have a first reverse bend 76A therein which defines a platform area 80A. A second reverse bend 84A in each panel grip member 70A and 72A is formed into a flat inclined ramp portion 88A. The space 86A between platform 80A and the underside 62A of the portion 224 of the clip fastener 210 is of sufficient depth to receive and retain securely a panel member therebetween.

The arcuate portion 214 and the barbed ear members 234 located in aperture 216 function in the same manner as in the preferred embodiment.

From the above, it will be apparent to one skilled in the art that the invention described is simple and inexpensive. The resilient, screwless clip fastener illustrated can be installed on a panel member which is flat or deformed with a minimum of time and without the use of screws. The cylindrical part or cable is rigidly and efficiently secured to the panel member and is in no way affected or loosened by vibration.

Having thus described my invention, I claim:

1. In a one piece screwless type clip fastener having a substantially flat body portion with a downwardly and outwardly turned tab portion at each end thereof for securing the clip fastener to a generally flat panel, an improvement which comprises said flat body portion being provided with a centrally located aperture, a flat ear member integral with said body portion extending into said aperture, said ear having means for retaining a cylindrical part, and said body portion having an upstanding arcuate section adjacent said aperture for engagement with the outside diameter of said cylindrical part along its axis.

2. In a one piece screwless type clip fastener having a substantially flat body portion with a downwardly and outwardly turned tab portion at each end thereof for securing the clip fastener to a generally flat panel, an improvement which comprises said flat body portion being provided with a generally rectangular centrally located aperture; flat ear members integral with the body portion extending into said rectangular aperture from two opposite edges of said aperture; said flat ear members having means for retaining a cylindrical part; and said body portion having an arcuate upstanding section adjacent said aperture for engagement along the axis of said cylindrical part between said panel and said clip fastener.

3. In a one piece resilient sheet metal clip fastener, the combination of: a substantially flat body portion; said body portion having panel engaging means; said body portion being provided with a generally rectangular centrally located aperture; an upstanding arcuate section adjacent each of two edges of said aperture; flat barbed ear members integral with the flat body portion extending into said rectangular aperture from opposite sides of said aperture; and said flat barbed ear members each having a concave forward edge; said concave forward edge and said upstanding arcuate sections being adapted for engagement with a cylindrical part along its axis.

4. In a one piece resilient sheet metal clip fastener, the combination of: a substantially flat body portion having a pair of centrally located upstanding arcuate sections on the outer longitudinal edges of said body portion with a rectangular aperture therebetween; a first panel engaging means on one end of the flat body portion for locating the fastener; a second panel engaging means on the opposite end thereof for positioning and retaining said fastener to a panel member having a similar downwardly depending arcuate section; generally flat barbed ear members integral with the flat body portion, which extend into said rectangular aperture; and said barbed ear members each having a concave forward edge thereon; said concave forward edges and said upstanding arcuate sections being adapted for engagement with a cylindrical part along its axis.

5. In a one piece sheet metal clip fastener, the combination of: a substantially flat body portion having a pair of centrally located upstanding arcuate sections with an aperture therebetween; a first panel engaging tab for locating the fastener which is formed at right angles to the body portion and then formed upwardly and outwardly to an angle less than 90°; a second panel engaging lug on the opposite end of said fastener which is formed radially downwardly and inwardly to form a ledge to receive therebetween a panel member having a downwardly depending arcuate section and again turned downwardly and outwardly to form a ramp section for rapidly installing said fastener to said panel member; a pair of flat ear members, there being a single ear extending from each of opposite edges of said aperture; and each of said ears having a concave forward edge; said ears and said upstanding arcuate sections being adapted for engagement with the circumference of a cylindrical member positioned on its axis between said clip and said panel member.

6. In a one piece resilient clip for securing a cylindrical part to a flat panel member, the combination of: a flat body portion; a pair of feet on said body; said body portion being spaced by said feet in generally parallel relationship from a flat panel member, the space being equal to about one-half the diameter of a cylindrical part to be secured; said flat body portion having a pair of centrally located upstanding arcuate sections with a generally rectangular aperture therebetween; panel engaging means integral with said flat body portion; flat barbed ear members integral with the body portion extending into said rectangular aperture from opposite sides of said aperture;

and each of said flat barbed ear members having a concave forward edge; said concave forward edges and said upstanding arcuate sections being adapted for engagement with the outside diameter of a cylindrical part along its axis.

7. In a one piece resilient sheet metal clip fastener for use on a substantially flat panel member, the combination of: a generally flat body portion, said flat body portion being provided with a generally rectangular aperture; an upstanding arcuate section adjacent said aperture on each of the outside longitudinal edges of said body; panel engaging means at each end of said fastener for maintaining said flat body portion in engagement with a panel number having a similar downwardly depending arcuate section; a pair of flat barbed resilient ear members; a single ear extending from each of opposite edges of said aperture, said ears being in parallel spaced relationship with said upstanding arcuate sections; and each of said ears having a concave forward edge; said concave edges and upstanding arcuate sections being adapted for firmly engaging the circumference of a cylindrical member along its axis.

References Cited in the file of this patent

UNITED STATES PATENTS

| | | |
|---|---|---|
| 2,137,653 | Lundberg | Nov. 22, 1938 |
| 2,208,727 | Marshall | July 23, 1940 |
| 2,251,723 | Tinnerman | Aug. 5, 1941 |
| 2,275,773 | Kost | Mar. 10, 1942 |
| 2,712,917 | Flora et al. | July 12, 1955 |
| 2,723,432 | Flora | Nov. 15, 1955 |
| 2,746,111 | Chvosta | May 22, 1956 |

FOREIGN PATENTS

| | | |
|---|---|---|
| 529,514 | Germany | July 14, 1931 |

UNITED STATES PATENT OFFICE
CERTIFICATE OF CORRECTION

Patent No. 3,023,470                          March 6, 1962

Alexander S. Patten

It is hereby certified that error appears in the above numbered patent requiring correction and that the said Letters Patent should read as corrected below.

Column 1, line 53, for "vew" read -- view --; column 5, line 14, for "number" read -- member --.

Signed and sealed this 26th day of June 1962.

(SEAL)
Attest:

ERNEST W. SWIDER
Attesting Officer

DAVID L. LADD
Commissioner of Patents